United States Patent
Kubota et al.

(10) Patent No.: US 11,467,428 B2
(45) Date of Patent: *Oct. 11, 2022

(54) ELECTRO-SWITCHABLE SPECTACLES FOR MYOPIA TREATMENT

(71) Applicant: ACUCELA INC., Seattle, WA (US)

(72) Inventors: Ryo Kubota, Seattle, WA (US); Amitava Gupta, Roanoke, VA (US)

(73) Assignee: ACUCELA INC., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/657,036

(22) Filed: Mar. 29, 2022

(65) Prior Publication Data

US 2022/0221738 A1    Jul. 14, 2022

Related U.S. Application Data

(63) Continuation of application No. 17/302,827, filed on May 13, 2021, now Pat. No. 11,320,674.
(Continued)

(51) Int. Cl.
*G02C 7/08* (2006.01)
*G02F 1/29* (2006.01)

(52) U.S. Cl.
CPC .............. *G02C 7/083* (2013.01); *G02F 1/294* (2021.01); *G02C 2202/24* (2013.01)

(58) Field of Classification Search
CPC .... G02C 7/083; G02C 2202/24; G02C 7/101; G02F 1/294; G02F 2201/30; G02F 1/13718; G02F 1/13756
(Continued)

(56) References Cited

U.S. PATENT DOCUMENTS 6,516,808 B2    2/2003  Schulman
7,018,040 B2    3/2006  Blum
(Continued)

FOREIGN PATENT DOCUMENTS

EP    3153139    4/2017
EP    3413116    12/2018
(Continued)

OTHER PUBLICATIONS

Adler, Daniel, et al., "The possible effect of under correction on myopic progression in children," Clin Exp Optom., 89:315-321 (2006).
(Continued)

*Primary Examiner* — Tuyen Tra
(74) *Attorney, Agent, or Firm* — Fisherbroyles LLP; John Shimmick

(57) ABSTRACT

An apparatus to treat refractive error of an eye comprises an electroactive component configured to switch between a light scattering or optical power providing configuration to treat refractive error of the eye and a substantially transparent configuration to allow normal viewing. The electroactive component can be located on the lens away from a central axis of the lens to provide light to a peripheral region of the retina to decrease the progression of myopia. The electroactive component can be located on the lens away from the central axis of the lens in order for the wearer to view objects through an optical zone while the electroactive component scatters light. The electroactive component can be configured to switch to the substantially transparent configuration to allow light to pass through the electroactive component and to allow the lens to refract light to correct vision and allow normal viewing through the lens.

10 Claims, 8 Drawing Sheets

Related U.S. Application Data

(60) Provisional application No. 63/024,379, filed on May 13, 2020.

(58) Field of Classification Search
USPC .................. 351/41, 159.01, 159.39, 159.4
See application file for complete search history.

(56) References Cited

U.S. PATENT DOCUMENTS

| | | |
|---|---|---|
| 8,246,167 B2 | 8/2012 | Legerton |
| 8,432,124 B2 | 4/2013 | Foster |
| 8,662,664 B2 | 3/2014 | Artal Soriano |
| 8,857,983 B2 | 10/2014 | Pugh |
| 9,345,813 B2 | 5/2016 | Hogg |
| 9,763,827 B2 | 9/2017 | Kelleher |
| 9,885,884 B2 | 2/2018 | Drobe |
| 9,918,894 B2 | 3/2018 | Lam |
| RE47,006 E | 8/2018 | To |
| 10,133,092 B2 | 11/2018 | Tsubota |
| 10,146,067 B2 | 12/2018 | Tsai |
| 10,231,897 B2 | 3/2019 | Tse |
| 10,268,050 B2 | 4/2019 | To |
| 10,288,909 B1 | 5/2019 | Youssef |
| 10,788,686 B2 | 9/2020 | Tsai |
| 10,884,264 B2 | 1/2021 | Hones |
| 10,921,612 B2 | 2/2021 | Zhou |
| 10,993,515 B1 | 5/2021 | Kim |
| 11,000,186 B2 | 5/2021 | Linder |
| 11,163,166 B1 | 11/2021 | Ebert |
| 11,187,921 B2 | 11/2021 | Zhou |
| 11,281,022 B2 | 3/2022 | Buscemi |
| 11,320,674 B2 | 5/2022 | Kubota |
| 11,358,001 B2 | 6/2022 | Kubota |
| 11,366,339 B2 | 6/2022 | Kubota |
| 11,366,341 B1 | 6/2022 | Kubota |
| 2002/0186345 A1 | 12/2002 | Duppstadt |
| 2003/0011745 A1 | 1/2003 | Molebny |
| 2004/0237971 A1 | 12/2004 | Radhakrishnan |
| 2004/0246441 A1 | 12/2004 | Stark |
| 2004/0257529 A1 | 12/2004 | Thomas |
| 2006/0082729 A1 | 4/2006 | To |
| 2007/0002452 A1 | 1/2007 | Munro |
| 2007/0076217 A1 | 4/2007 | Baker |
| 2007/0115431 A1 | 5/2007 | Smith, III |
| 2007/0127349 A1 | 6/2007 | Hotta |
| 2008/0291391 A1 | 11/2008 | Meyers |
| 2008/0309882 A1 | 12/2008 | Thorn |
| 2009/0002631 A1 | 1/2009 | Campbell |
| 2009/0187242 A1 | 7/2009 | Weeber |
| 2009/0204207 A1 | 8/2009 | Blum |
| 2010/0076417 A1 | 3/2010 | Suckewer |
| 2010/0296058 A1 | 11/2010 | Ho |
| 2011/0085129 A1 | 4/2011 | Legerton |
| 2011/0153012 A1 | 6/2011 | Legerton |
| 2011/0157554 A1 | 6/2011 | Kawai |
| 2011/0202114 A1 | 8/2011 | Kessel |
| 2012/0062836 A1 | 3/2012 | Tse |
| 2012/0199995 A1 | 8/2012 | Pugh |
| 2012/0206485 A1 | 8/2012 | Osterhout |
| 2012/0212399 A1 | 8/2012 | Border |
| 2012/0215291 A1 | 8/2012 | Pugh |
| 2013/0027655 A1 | 1/2013 | Blum |
| 2013/0278887 A1 | 10/2013 | Legerton |
| 2014/0039048 A1 | 2/2014 | Olof |
| 2014/0039361 A1 | 2/2014 | Siu |
| 2014/0194773 A1 | 7/2014 | Pletcher |
| 2014/0218647 A1 | 8/2014 | Blum |
| 2014/0240665 A1 | 8/2014 | Pugh |
| 2014/0268029 A1 | 9/2014 | Pugh |
| 2014/0277291 A1 | 9/2014 | Pugh |
| 2014/0379054 A1 | 12/2014 | Cooper |
| 2015/0057701 A1 | 2/2015 | Kelleher |
| 2015/0109574 A1 | 4/2015 | Tse |
| 2015/0160477 A1 | 6/2015 | Dai |
| 2015/0241706 A1* | 8/2015 | Schowengerdt ..... H04N 13/363 345/633 |
| 2016/0056498 A1 | 2/2016 | Flitsch |
| 2016/0067037 A1 | 3/2016 | Rosen |
| 2016/0091737 A1 | 3/2016 | Kim |
| 2016/0143801 A1 | 5/2016 | Lam |
| 2016/0158486 A1 | 6/2016 | Colbaugh |
| 2016/0212404 A1 | 7/2016 | Maiello |
| 2016/0270656 A1 | 9/2016 | Samec |
| 2016/0377884 A1 | 12/2016 | Lau |
| 2017/0000326 A1 | 1/2017 | Samec |
| 2017/0001032 A1 | 1/2017 | Samec |
| 2017/0010480 A1 | 1/2017 | Blum |
| 2017/0014074 A1 | 1/2017 | Etzkorn |
| 2017/0055823 A1 | 3/2017 | Lu |
| 2017/0072218 A1 | 3/2017 | Rucker |
| 2017/0078623 A1 | 3/2017 | Hilkes et al. |
| 2017/0097519 A1 | 4/2017 | Lee |
| 2017/0184875 A1 | 6/2017 | Newman |
| 2017/0229730 A1 | 8/2017 | Flitsch |
| 2017/0236255 A1 | 8/2017 | Wetzstein |
| 2017/0270636 A1 | 9/2017 | Shtukater |
| 2017/0276963 A1 | 9/2017 | Brennan |
| 2017/0307779 A1 | 10/2017 | Marullo |
| 2018/0017810 A1 | 1/2018 | Wu |
| 2018/0017814 A1 | 1/2018 | Tuan |
| 2018/0052319 A1 | 2/2018 | McCabe |
| 2018/0055351 A1 | 3/2018 | Yates |
| 2018/0074322 A1 | 3/2018 | Rousseau |
| 2018/0090958 A1 | 3/2018 | Steger |
| 2018/0092738 A1 | 4/2018 | Tai |
| 2018/0136486 A1 | 5/2018 | MacNamara |
| 2018/0161231 A1 | 6/2018 | Tse |
| 2018/0173010 A1 | 6/2018 | Harant |
| 2018/0188556 A1 | 7/2018 | Portney |
| 2018/0221140 A1 | 8/2018 | Rosen |
| 2018/0275427 A1 | 9/2018 | Lau |
| 2018/0345034 A1 | 12/2018 | Butzloff |
| 2019/0033618 A1 | 1/2019 | Choi |
| 2019/0033619 A1 | 1/2019 | Neitz |
| 2019/0038123 A1 | 2/2019 | Linder |
| 2019/0049730 A1 | 2/2019 | Miller |
| 2019/0076241 A1 | 3/2019 | Alarcon Heredia |
| 2019/0107734 A1 | 4/2019 | Lee |
| 2019/0113757 A1 | 4/2019 | Van Heugten |
| 2019/0129204 A1 | 5/2019 | Tsubota |
| 2019/0227342 A1 | 7/2019 | Brennan |
| 2019/0235279 A1 | 8/2019 | Hones |
| 2019/0247675 A1 | 8/2019 | Legerton |
| 2019/0250432 A1 | 8/2019 | Kim |
| 2019/0314147 A1* | 10/2019 | Blum ................. H04N 5/2253 |
| 2020/0033637 A1 | 1/2020 | Jamshidi |
| 2020/0089023 A1 | 3/2020 | Zhou |
| 2020/0110265 A1 | 4/2020 | Serdarevic |
| 2020/0133024 A1 | 4/2020 | Paune Fabre |
| 2020/0142219 A1 | 5/2020 | Rousseau |
| 2020/0183169 A1 | 6/2020 | Peng |
| 2020/0360184 A1 | 11/2020 | Xiao |
| 2021/0018762 A1 | 1/2021 | Zheleznyak |
| 2021/0031051 A1 | 2/2021 | Kubota |
| 2021/0048690 A1 | 2/2021 | Guillot |
| 2021/0069524 A1 | 3/2021 | Kubota |
| 2021/0263336 A1 | 8/2021 | Gupta |
| 2021/0298440 A1 | 9/2021 | Kim |
| 2021/0356767 A1 | 11/2021 | Kubota |
| 2021/0379399 A1 | 12/2021 | Buscemi |
| 2021/0382325 A1 | 12/2021 | Kubota |
| 2021/0382326 A1 | 12/2021 | Kubota |
| 2021/0389607 A1 | 12/2021 | Buscemi |

FOREIGN PATENT DOCUMENTS

| | | |
|---|---|---|
| KR | 20180038359 A | 4/2018 |
| WO | 2009074638 A3 | 6/2009 |
| WO | 2009121810 | 10/2009 |
| WO | 2010043599 | 4/2010 |
| WO | 2011089042 | 7/2011 |
| WO | 2012136470 | 10/2012 |
| WO | 2013087518 | 6/2013 |

(56) References Cited

FOREIGN PATENT DOCUMENTS

| | | |
|---|---|---|
| WO | 2013158418 | 10/2013 |
| WO | 2014033035 | 3/2014 |
| WO | 2014191460 | 12/2014 |
| WO | 2015063097 | 5/2015 |
| WO | 2015186723 | 12/2015 |
| WO | 2015192117 | 12/2015 |
| WO | 2017094886 | 6/2017 |
| WO | 2017097708 | 6/2017 |
| WO | 2018014712 | 1/2018 |
| WO | 2018014960 | 1/2018 |
| WO | 2018085576 | 5/2018 |
| WO | 2018208724 | 11/2018 |
| WO | 2019114463 | 6/2019 |
| WO | 2019191510 | 10/2019 |
| WO | 2019217241 | 11/2019 |
| WO | 2020014074 | 1/2020 |
| WO | 2020014613 | 1/2020 |
| WO | 2020028177 | 2/2020 |
| WO | 2020069232 | 4/2020 |
| WO | 2021022193 | 2/2021 |
| WO | 2021056018 | 3/2021 |
| WO | 2021168481 | 8/2021 |
| WO | 2021231684 | 11/2021 |
| WO | 2021252318 | 12/2021 |
| WO | 2021252319 | 12/2021 |
| WO | 2021252320 | 12/2021 |

OTHER PUBLICATIONS

Aleman, Andrea C., et al.,, "Reading and Myopia: Contrast Polarity Matters," Scientific Reports, 8 pages (2018).
Arden, G.B., et al., "Does dark adaptation exacerbate diabetic retinopathy? Evidence and a linking hypothesis," Vision Research 38:1723-1729 (1998).
Arden, GB, et al, "Regression of early diabetic macular edema is associated with prevention of dark adaptation", in Eye, (2011). 25, pp. 1546-1554.
Benavente-Perez, A., et al., "Axial Eye Growth and Refractive Error Development Can Be Modified by Exposing the Peripheral Retina to Relative Myopic or Hyperopic Defocus," Invest Ophthalmol Vis Sci., 55:6765-6773 (2014).
Bonar, Jr, et al, "High brightness low power consumption microLED arrays", in SPIE DigitalLibrary.org/conference-proceedings-of-spie, SPIE OPTO, 2016, San Francisco, California, United States, Abstract Only.
Carr, Brittany J., et al., "The Science Behind Myopia," retrieved from https://webvision.med.utah.edu/book/part-xvii-refractive-errors/the-science-behind-myopia-by-brittany-j-carr-and-william-k-stell/, 89 pages (2018).
Chakraborty, R., et al., "Diurnal Variations in Axial Length, Choroidal Thickness, Intraocular Pressure, and Ocular Biometrics," IOVS, 52(8):5121-5129 (2011).
Chakraborty, R., et al., "Hyperopic Defocus and Diurnal Changes in Human Choroid and Axial Length," Optometry and Visual Science, 90(11):1187-1198 (2013).
Chakraborty, R., et al., "Monocular Myopic Defocus and Daily Changes in Axial Length and Choroidal Thickness of human Eyes," Exp Eye Res, 103:47-54 (2012).
Cook, Colin A., et al., "Phototherapeutic Contact Lens for Diabetic Retinopahty," 2018 IEEE Micro Electro Mechanical Systems, pp. 62-65, XP033335512, (Jan. 21, 2018).
Cooper, J., et al., "Current status of the development and treatment of myopia", Optometry, 83:179-199 (2012).
Cooper, J., et al., "A Review of Current Concepts of the Etiology and Treatment of Myopia," Eye & Contact Lens, 44(4):231-247 (Jul. 2018).
Demory, B., et al., "Integrated parabolic microlenses on micro LED color pixels", in Nanotechnology, (2018); 29, 16, pp. 1018, Abstract Only.
Dolgin, Elie, "The Myopia Boom," Nature 519:276-278 (2015).
Edrington, Timothy B., "A literature review: The impact of rotational stabilization methods on toric soft contact lens performance," Contact Lens & Anterior Eye, 34:104-110 (2011).
Flitcroft, D.I., "The complex interactions of retinal, optical and environmental factors in myopia aetiology," 31(6):622-660 (2012).
Garner, L.F., et al., "Crystalline Lens Power in Myopia," Optometry and Vision Science, 69:863-865 (1992).
Gwiazda, Jane, "Treatment Options for Myopia," retrieved from https://www.ncbi.nlm.nih.gov/pmc/articles/PMC2729053/, Optom Vis Sci., 86(6):624-628 (Jun. 2009).
Gwiazda, Jane, et al., "A Randomized Clinical Trial of Progressive Addition Lenses versus Single Vision Lenses on the Progression of Myopia in Children", Invest Ophthalmol Vis Sci, 44:1492-500 [PubMed: 12657584] (2003).
Haglund, Erik, et al., "Multi-wavelength VCSEL arrays using high-contrast gratings," Proc. of SPIE vol. 10113, 7 pp. (2017).
Hammond, D.S., et al, "Dynamics of active emmetropisation in young chicks—influence of sign and magnitude of imposed defocus" Ophthalmic Physiol Opt. 33:215-222 (2013).
Henry W., "MicroLED Sources enable diverse ultra-low power applications", in Photonic Spectra, 2013.
International Search Report and Written Opinion for International Application No. PCT/US2021/032162, 19 pages (Oct. 22, 2021).
Jayaraman, V., et al., "Recent Advances in MEMS-VCSELs for High Performance Structural and Functional SS-OCT Imaging," Proc. of SPIE vol. 8934, retrieved from http://proceedings.spiedigitallibrary.org/ on Dec. 1, 2015 (2014).
Jones, D., "Measure Axial Length to Guide Myopia Management," Review of Myopia Management, 5 pages (Apr. 9, 2020).
Kur, Joanna, et al., "Light adaptation does not prevent early retinal abnormalities in diabetic rats," Scientific Reports, 8 pages (Feb. 8, 2016).
Lagreze, Wolf A., et al., "Preventing Myopia," retrieved from https://www.ncbi.nlm.nih.gov/pmc/articles/PMC5615392/, Dtsch Arztebl Int., 114(35-36):575-580 (Sep. 2017).
Lam, Carly Siu Yin, et al., "Defocus Incorporated Multiple Segments (DIMS) spectacle lenses slow myopia progression: a 2-year randomised clinical trial," Br. J. Ophthalmol. 0:1-6 (2019).
Leo, Seo-Wei, et al., "An evidence-based update on myopia and interventions to retard its progression," J AAPOS, 15(2):181-189 (Apr. 2011).
Lingley, A.R., et al, : A single pixel wireless contact lens display, in J Micromech. Microeng., 2011; 21, 125014; doi:10.1088/0960-1317/21/12/125014, Abstract Only.
Martin, J.A., et al., "Predicting and Assessing Visual Performance with Multizone Bifocal Contact Lenses," Optom Vis Sci, 80(12):812-819 (2003).
Matkovic, K., et al., "Global Contrast Factor—a New Approach to Image Contrast," Computational Aesthetics in Graphics, Visualization and Imaging, 9 pages (2005).
McKeague C, et al. "Low-level night-time light therapy for age-related macular degeneration (ALight): study protocol for a randomized controlled trial", in Trials 2014, 15:246, http://www.trialsjournal.com/content/15/1/246.
Moreno, I, "Creating a desired lighting pattern with an LED array" in Aug. 2008, Proceedings of SPIE—The International Society for Optical Engineering 7058, DOI: 10.1117/12.795673.
Moreno, I., "Modeling the radiation pattern of LEDS", in Optics Express, 2008; 16, 3 pp. 1808.
Nickla, Debora L., et al., "Brief hyperopic defocus or form deprivation have varying effects on eye growth and ocular rhythms depending on the time-of-day of exposure," Exp Eye Res. 161:132-142 (Aug. 2017).
Ramsey, DJ, and Arden, GB, "Hypoxia and dark adaptation in diabetic retinopathy: Interactions, consequences and therapy", in Microvascular Complications—Retinopathy (JK Sun, ed.), Cur Dab Rep (2015) 15: 118, DOI 10.1007/s11892-015-0686-2, Abstract Only.
Read, Scott A., et al., "Choroidal changes in human myopia: insights from optical coherence tomography imaging," Clin Exp Optom, 16 pages (2018).
Read, Scott A., et al., "Human Optical Axial Length and Defocus," IOVS, 51(12):6262-6269 (2010).

(56) References Cited

OTHER PUBLICATIONS

Shivaprasad, S, et al, "Clinical efficacy and safety of a light mask for prevention of dark adaptation in treating and preventing progression of early diabetic macular oedema at 24 months (CLEOPATRA): a multicentre, phase 3, randomised controlled trial," in www.thelancet.com/diabetes-endocrinology vol. 6, pp. 382-391 ( May 2018).

Smith, III, Earl L., "Optical treatment strategies to slow myopia progression: Effects of the visual extent of the optical treatment zone," retrieved from https://www.ncbi.nlm.nih.gov/pmc/articles/PMC3624048/, Exp Eye Res., 114:77-88 (Sep. 2013).

Srinivasan, S., "Ocular axes and angles: Time for better understanding," J. Cataract Refract. Surg., 42:351-352 (Mar. 2016).

Torii, Hidemasa, et al., "Violet Light Exposure Can Be a Preventive Strategy Against Myopia Progression," EBioMedicine 15:210-219 (2017).

U.S. Appl. No. 17/302,479, filed May 4, 2021 (60 pages).

Wallman, Josh, et al., "Homeostasis of Eye Growth and the Question of Myopia," Neuron, 43:447-468 (2004).

Wolffsohn, James A., et al., "Impact of Soft Contact Lens Edge Design and Midperipheral Lens Shape on the Epithelium and Its Indentation With Lens Mobility," IOVS, 54(9):6190-6196 (2013).

\* cited by examiner

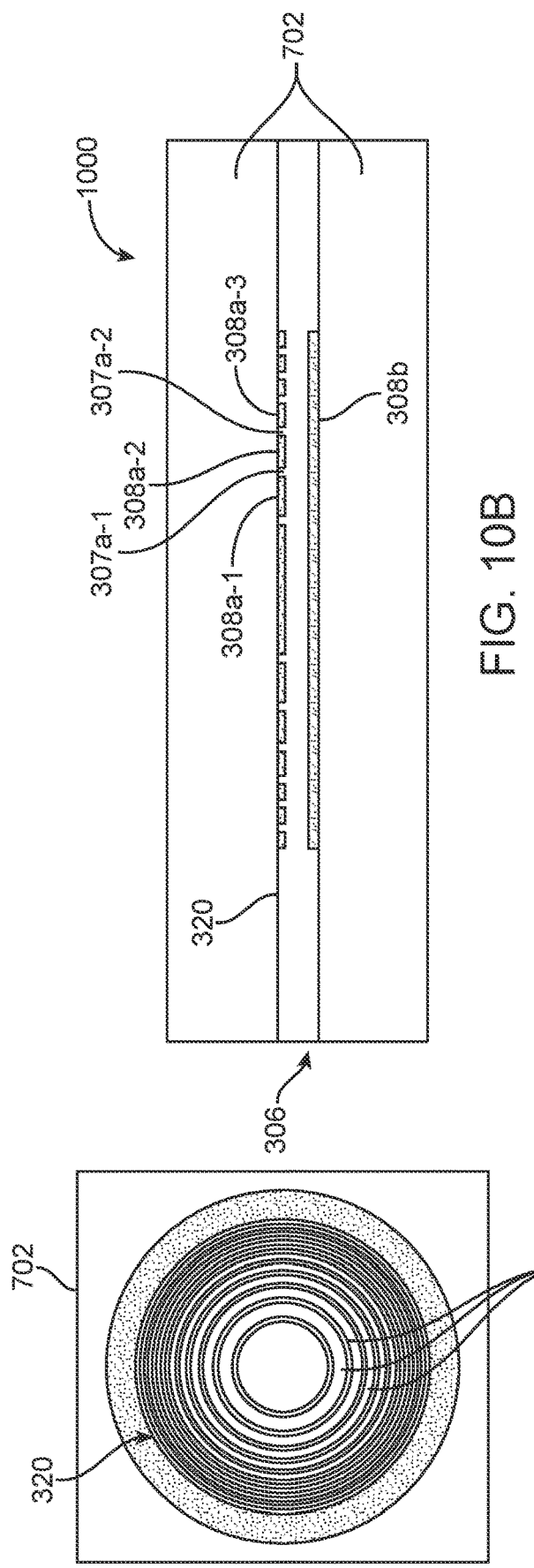

ELECTRO-SWITCHABLE SPECTACLES FOR MYOPIA TREATMENT

RELATED APPLICATIONS

This application is a continuation of U.S. patent application Ser. No. 17/302,827, filed May 13, 2021, now U.S. Pat. No. 11,320,674, issued May 3, 2022, which claims the benefit under 35 U.S.C. § 119(e) of U.S. Provisional Patent Application No. 63/024,379, filed May 13, 2020, the disclosures of which are incorporated, in their entirety, by this reference.

The subject matter of the present application is related to PCT/US2020/044571, filed Jul. 31, 2020, published as WO/2021/022193 on Feb. 4, 2021, the entire disclosure of which is incorporated herein by reference.

BACKGROUND

Work in relation to the present disclosure suggests that myopically defocused light to the peripheral retina can decrease the progression of myopia. However, at least some of the prior approaches can be less than ideal in at least some respects. For example, at least some of the prior approaches can be more complex than would be ideal and may provide less than ideal treatment results. Also, at least some of the prior approaches can degrade vision more than would be ideal.

In light of the above, improved methods and apparatus for treating refractive error that ameliorate at least some of the limitations of the prior approaches are needed.

SUMMARY

In some embodiments, an apparatus to treat refractive power of one or both eyes such as an eyeglass optic comprises a lens to correct refractive power and a switchable optical component. The switchable optical component can be configured with an electroactive material to provide optical power or light scattering to treat refractive error of the eye. The switchable optical component can be configured to turn on and off manually or automatically using an electronic control system. In an off state, the additional optical component functions as a substantially transparent optical layer with no substantial optical power or light scattering. In an on state, the optical component is either switched to a fixed or controllable amount of optical power, or a fixed or controllable amount of light scatter. In some embodiments, the switchable component comprises an electro-active optic comprising a plurality of optical elements, such as pixels. In some embodiments, the electro-active optical component comprises a switchable optical element, such as a diffractive optic or a patterned electrode. In some embodiments a polarization insensitive liquid crystal based diffractive optic comprises a diffractive surface relief on the inner surface of the electro-active optical component. In some embodiments, the electro-active optical element comprises a patterned electrode, and the patterned electrode provides a temporary refractive index modulation within the liquid crystal material which provides a diffractive optical power such as a positive optical power. In some embodiments, the switchable optical elements of the electro-active component comprise pixels, so that a portion or all of the optical elements of the electro-active component may be switched on to provide optical power such as an added plus power. In some embodiments, the electro-active component may be fabricated in the form of an annulus surrounding a clear central zone. In some embodiments, the switchable optical component may comprise a liquid lens, that be switched manually or automatically using an electronic control system to provide a change in optical power, such as an added plus power.

In some embodiments, an apparatus to treat refractive error of an eye comprises an electroactive component configured to switch between a light scattering configuration to treat refractive error of the eye and a substantially transparent configuration to allow normal viewing. The electroactive component can be located on the lens away from a central axis of the lens to provide scattered light to a peripheral region of the retina in order to decrease the progression of a refractive error such as myopia. The electroactive component can be located on the lens at a location away from the central axis of the lens in order for the wearer to view objects through an optical zone while the electroactive component scatters light. The electroactive component can be configured to switch to the substantially transparent configuration to allow light to pass through the electroactive component and to allow the lens to refract light to correct vision and allow normal viewing through the lens. The lens may comprise any suitable lens, such as a lens configured to correct refractive error of the wearer.

INCORPORATION BY REFERENCE

All patents, applications, and publications referred to and identified herein are hereby incorporated by reference in their entirety, and shall be considered fully incorporated by reference even though referred to elsewhere in the application.

BRIEF DESCRIPTION OF THE DRAWINGS

A better understanding of the features, advantages and principles of the present disclosure will be obtained by reference to the following detailed description that sets forth illustrative embodiments, and the accompanying drawings of which:

FIG. 5B shows a change in the index of the LC material as in FIG. 5A with the LC electrodes on.

FIG. 6B shows a decreased index matching between particles and the LC material over a range of wavelengths as in FIG. 6B with the LC electrodes on;

FIG. 10A shows a front view of an electrode profile to provide optical power, in accordance with some embodiments;

FIG. 10B shows a side view of the electrode profile of FIG. 10A.

DETAILED DESCRIPTION

The following detailed description provides a better understanding of the features and advantages of the inventions described in the present disclosure in accordance with the embodiments disclosed herein. Although the detailed description includes many specific embodiments, these are provided by way of example only and should not be construed as limiting the scope of the inventions disclosed herein.

The presently disclosed methods and apparatus are well suited for the treatment of refractive error. The presently disclosed methods and apparatus can be used to decrease the progression of one or more types of refractive error, such as myopia, astigmatism and hyperopia, and are well suited for combination with prior devices such as spectacles, contact lenses, augmented reality (AR) displays, virtual reality (VR) displays.

Although the presently disclosed methods and apparatus can be used to treat many types of refractive error, the presently disclosed methods and apparatus are well suited to treat the progression of myopia, for example.

Work in relation to the present disclosure suggests that a suitable stimulus, such as scattered light or a defocused image can decrease a progression of refractive error such as myopia, and in some instances may be able to ameliorate a refractive error of the eye. The refractive error can be changed by altering an axial length of the eye, or a choroidal thickness, and combinations thereof in response to the stimulus.

Figure 1:
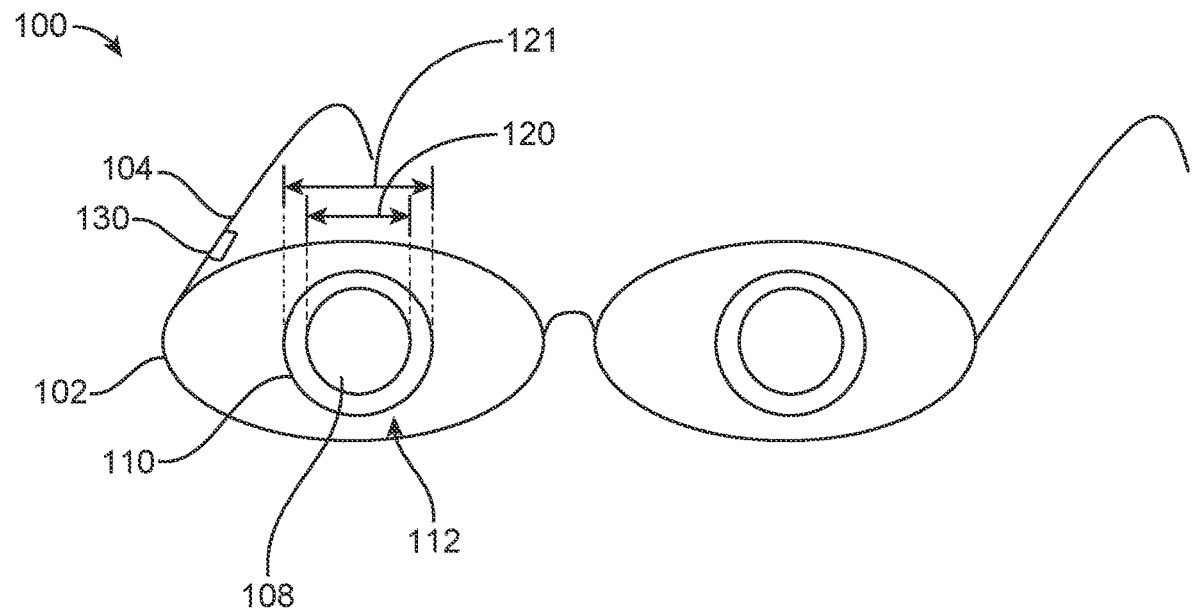
FIG. 1 shows an apparatus to treat refractive error of an eye, in accordance with some embodiments.

FIG. 1 shows an apparatus 100 to treat refractive error of an eye. In some embodiments, the apparatus 100 comprises a lens 102 such as a lens 102 to treat refractive error of the of the eye. The lens 102 is supported on the patient with a support, such as an eyeglass frame 104 although other supports and head mounted configurations can be used such as monocles, straps, goggles and the like.

The lens 102 can be configured in many ways, and can be configured to treat one or more of myopia, hyperopia, or astigmatism of the eye. The lens 102 comprises an optically transmissive material and can be shaped to provide vision to the wearer. The apparatus 100 comprises a switchable zone 110, which is configured to switch between a light scattering configuration to treat the progression of refractive error, and a light refracting configuration to allow light to refract through the switchable zone 110. In some embodiments, the switchable zone 110 comprises a layer of an electroactive component 112 placed on the lens 102. The electroactive component 112 comprises an electroactive material, such as a liquid crystal material, for example. In some embodiments, the electroactive component 112 comprises a substantially translucent configuration that can be changed to a substantially transparent material and vice versa, for example with application of a voltage. In some embodiments, the electroactive component 112 is configured to be translucent with application of a voltage and to be substantially transparent without application of the voltage. Alternatively, the electroactive component 112 can be configured to be substantially transparent with application of a voltage and to be substantially translucent without application of the voltage In some embodiments, the switchable zone 110 extends around an optical zone 108. The switchable zone 110 can be located on a portion of the lens 102 to configured provide light with similar refraction to the optical zone 108, such that the switchable zone 110 is substantially invisible to the user in the light refracting configuration. This approach has the advantage of the lens appearing normal to the user under normal viewing conditions, i.e. when the switchable zone 110 is not performing treatment.

In some embodiments, the switchable zone 110 is dimensioned to provide scattered light to a peripheral portion of the retina. In some embodiments, the peripheral portion of the retina comprises a region of the retina outside the macula, so as to provide clear vision to the macula when the user looks ahead and the switchable zone 110 scatters light onto the peripheral retina. The switchable zone 110 may comprise an inner dimension 120 corresponding to an inner boundary, e.g. an inner diameter of an annulus, and an outer dimension 121 corresponding to an outer boundary of the switchable zone 110, e.g. and outer diameter of the annulus. Although the switchable zone 110 can be sized and shaped in many ways, in some embodiments the switchable zone 110 comprises an annular shape with an inner diameter and an outer diameter. Although reference is made to an annular shape, the switchable zone 110 can be configured with other shapes, such as polygons, squares, triangles, and may comprise a plurality of discrete switchable zones located around the optical zone 108 at appropriate locations.

In some embodiments, the apparatus 100 comprises circuitry 130 to control the switchable zone 110. The circuitry 130 can be mounted at any suitable location on the support, for example along an extension of an eyeglass frame 104, on a peripheral portion of the lens 102, or between lenses, such as on a bridge sized to extend over a nose of the wearer.

Although the apparatus 100 can be configured in many ways, in some embodiments the apparatus 100 is configured as a binocular device to treat both eyes of the wearer. For example, the device may comprise a second lens, a second optical zone, a second electroactive component and a second switchable zone configured to treat a second eye of the wearer, similar to the components used to treat the first eye.

Figure 2:
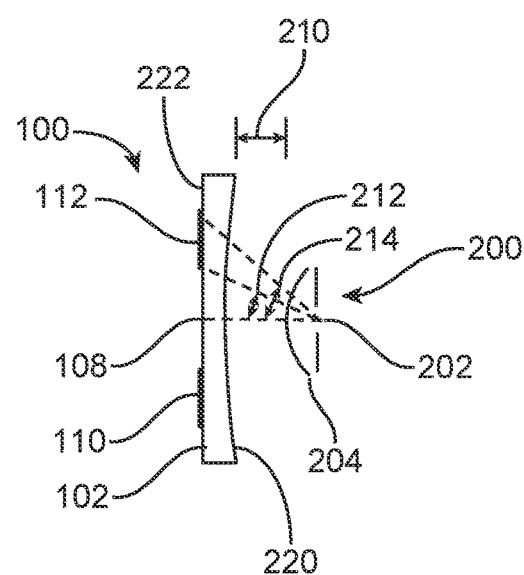
FIG. 2 shows an apparatus as in FIG. 1 placed in front of an eye, in accordance with some embodiments.

FIG. 2 shows an apparatus 100 as in FIG. 1 placed in front of an eye 200. The eye 200 comprises a pupil 202 and a cornea 204. The components of the apparatus 100 are placed an arranged with reference to the eye 200. The posterior surface of the lens 102 is placed at a distance from the vertex of the cornea 204. The posterior surface 220 of the lens 102 may comprise a majority of the optical power of the lens 102. The posterior surface 220 may comprise a concave surface with negative optical power to provide clear vision to a myopic wearer, for example. The optical zone comprises a center that is aligned with the line of sight of the eye 200 when the patient looks forward.

When the pupil 202 of the eye 200 is viewed from outside the eye 200, the cornea 204 of the eye 200 forms a virtual image of the pupil 202 that is slightly anterior to the physical position of the pupil 202. In some embodiments, this virtual image of the pupil 202 comprises an entrance pupil of the eye.

The switchable zone 110 is dimensioned to provide light to the entrance pupil of the eye so that the light scattered by the switchable zone 110 is directed to peripheral regions of the retina. The switchable zone 110 is placed at a distance 210 in front of the eye 200, so that the scattered light enters the entrance pupil of the eye at an oblique angle and is directed to the peripheral regions of the retina, e.g. outside the macula.

The dimensions of the optical zone and switchable zone 110 can be configured in many ways. In some embodiments, the optical zone is sized to transmit light at an angle within range from 12 degrees to 20 degrees with reference to an entrance pupil of the eye 200, or within a range from 14 to 16 degrees, for example. In some embodiments, the angle comprises a half-angle, such as an angle between the center of the optical zone, the center of the entrance pupil and the boundary of the optical zone. In some embodiments, the switchable zone 110 is sized to transmit light at an angle within range from 15 degrees to 50 degrees with reference to an entrance pupil of the eye, for example. In some embodiments, the switchable zone 110 comprises an inner boundary and an outer boundary, the inner boundary corresponding to an inner boundary angle 212 within a range from 15 degrees to 20 degrees with reference to the entrance pupil of the eye, the outer boundary corresponding to an outer boundary angle 214 within a range from 25 degrees to 50 degrees with reference to the entrance pupil of the eye. In some embodiments, the lens 102 is mounted on an eyeglass frame 104 to provide a vertex distance 210 to a cornea of the eye, the vertex distance 210, the inner boundary and the outer boundary dimensioned to provide the inner boundary angle 212 and the outer boundary angle 214 with reference to the entrance pupil 202 of the eye.

While the electroactive component 112 and lens 102 can be arranged in many ways, in some embodiments the electroactive component 112 comprising the switching zone is located on a front side 222 of the lens 102 and the majority of the optical power of the lens 102 is located on a back side 220 of the lens 102.

Figure 3:
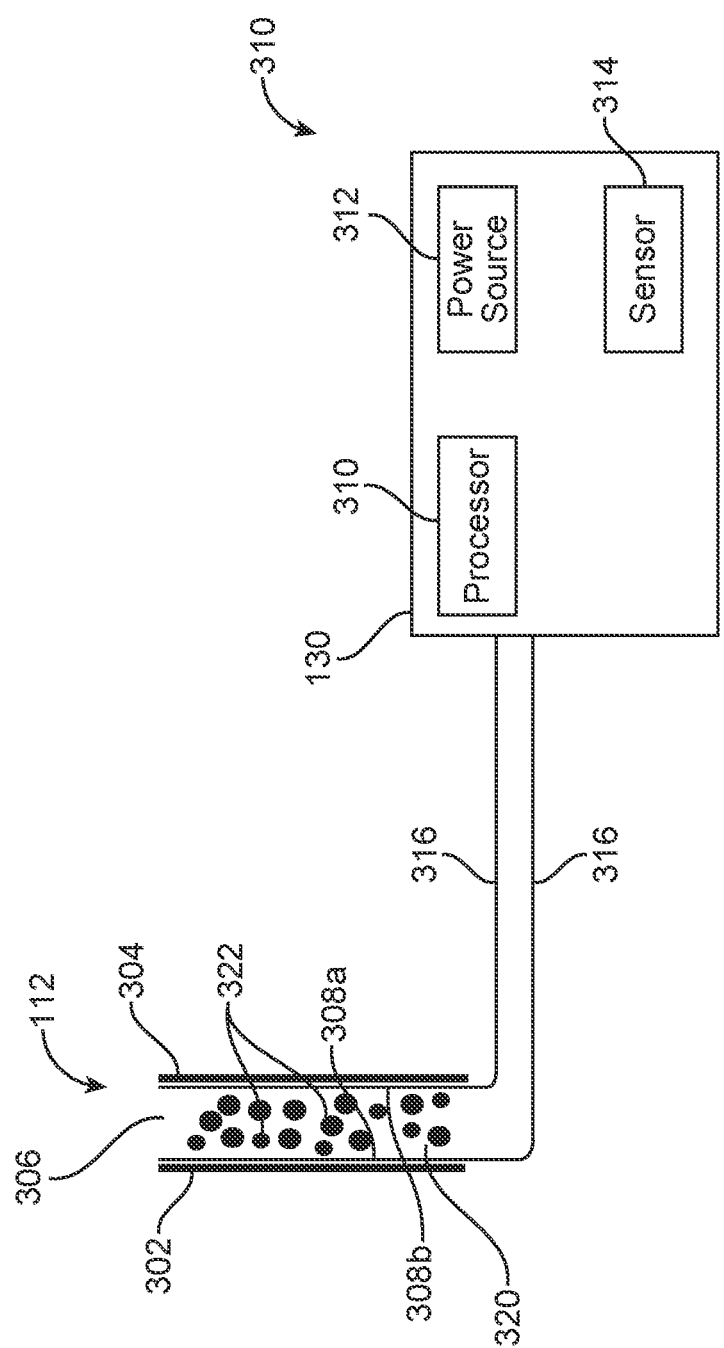
FIG. 3 shows an electroactive component and associated circuitry, in accordance with some embodiments.

FIG. 3 shows an electroactive component 112 and associated circuitry 130. In some embodiments, the electroactive component 112 comprises an adhesive layer 302, a scratch resistant layer 304 and a switchable layer 306. The adhesive layer 302 comprises an adhesive to adhere the electroactive component 112 to the lens 102. The adhesive layer 302 may comprise any suitable adhesive suitable for adhering to the lens 102. The scratch resistant layer 304 may comprise a scratch resistant material suitable for use on an exterior surface to prevent scratches and optical degradation of the exterior surface of the electroactive component 112.

In some embodiments, circuitry 130 is operatively coupled to the electroactive component 112, such as by electrical conductors 316, in order to control switching of the electroactive component 112. The circuitry 130 can be coupled to the switchable zone 110 to control a configuration of the switchable zone 110. The circuitry 130 can be configured in many ways and may comprise one or more of a processor 310, a microcontroller, a sensor 314 or logic circuitry to control the configuration of the switchable zone 110, such as a first configuration for light scatter or a second configuration for substantially transparent transmission of light. The configuration of switchable zone 110 can be controlled in response to inputs to the circuitry 130, such as user inputs from a switch or a software application (e.g. an app), or inputs provided by a health care provider. In some embodiments, the circuitry 130 comprises a power source 312 to apply a voltage to the switchable zone 110. The power source may comprise a rechargeable battery.

In some embodiments, the circuitry 130 is configured to vary an amount of light scatter of the switchable zone 110 to vary an amount of substantially scattered light, and the first configuration may comprise a plurality of configurations, each of which is configured to scatter a different amount of light.

An electrode 308a can be located on adhesive layer 302 and another electrode 308b located on the scratch resistant layer 304 with a liquid crystal material 320 and particles 322 located between the two electrodes 308. The electrodes 308 may comprise any suitable material such as indium tin oxide (ITO). In some embodiments, the electrodes 308 are substantially transparent. In some embodiments, the scratch resistant layer 304 comprises a substantially transparent electrode 308a oriented toward the switchable layer 306 and the adhesive layer 302 comprises a substantially transparent electrode 308b oriented toward the switchable layer 306. Each of the substantially transparent electrodes 308 may comprise a thickness within a range from 25 to 250 Angstroms.

The liquid crystal material 320 can be configured to vary its index of refraction in response to a voltage and corresponding electric field between the two electrodes 308. In a first configuration, the index of refraction of the liquid crystal material 320 is substantially different from the index of refraction of the particles 322, in order for the particles 322 to scatter light. In a second configuration, the index of refraction of the liquid crystal material 320 is substantially similar to the index of refraction of the particles 322, in order to refract light with the lens 102.

The layers can be dimensioned with any appropriate thickness. In some embodiments, the adhesive layer 302, the scratch resistant layer 304 and the switchable layer 306 comprise a combined thickness within a range from 0.1 mm to 2 mm, although this range can be smaller, for example from 0.1 mm to 1 mm. In some embodiments, the scratch resistant layer 304 comprises a thickness within a range from 10 microns to 100 microns, the adhesive layer 302 comprises a thickness within a range from 10 microns to 100 microns and the switchable layer 306 comprises a thickness within a range from 25 microns to 1000 microns.

Materials other than liquid crystals that are electroactive may also be used to construct the switchable medium. Aromatic materials with linear molecular configurations and high polarizabilities, such as cinnamic acid and azobenzene and its derivatives may be used, for example.

The switchable zone 110 can be configured in many ways. In some embodiments, the switchable zone 110 comprises a liquid crystal material 320 and particles 322 within the liquid crystal material 320, and the particles 322 scatter light a greater amount of in a first configuration than in a second configuration. The particles 322 may comprise any suitable shape such as one or more of irregular particles, filaments, ellipsoidal particles, spheres or microspheres.

The particles 322 can be sized with any suitable dimensions. In some embodiments, the particles 322 comprise a diameter within a range from 1 micron to 1000 microns, or within a range from 5 microns to 500 microns, for example within a range from 10 microns to 250 microns. The particles 322 may comprise non-spherical or spherical particles, in which the particles 322 comprise a maximum distance across within a range from 1 micron to 1000 microns and optionally within a range from 5 microns to 500 microns and optionally within a range from 10 microns to 250 microns.

The particles 322 may comprise a distribution of sizes. In some embodiments, the particles 322 comprise a size distribution in which a majority of the particles 322 are at least 5 microns across and no more 500 microns across. In some embodiments, a majority of the particles 322 are at least 10 microns and no more than 250 microns. The particles 322 with these distributions of sizes may comprise spheres, in which the dimensions comprise diameters, although the particles 322 may comprise other shapes as described herein.

In some embodiments, the particles 322 comprise a distribution of particle sizes configured to scatter light into an entrance of the eye 200 with a first amount at 400 nm and a second amount at 750 nm, in which the first amount within 25% of the second amount. This uniformity of the scattering as perceived by the wearer can be helpful to provide a more uniform stimulation to the peripheral regions of the retina. In some embodiments, the distribution of particles 322 is configured to scatter light substantially uniformly over a range of wavelengths from 400 nm to 750 nm, and the amount of scatter over the range varies no more than about 25%.

The size and distribution of the particles 322 can be configured in many ways to provide one or more of Mie scattering or Rayleigh scattering, for example. Depending on the size the distribution of sizes of the particles 322, the scattering may comprise Mie scattering and Rayleigh scattering, for example. In some embodiments, the distribution of particle size comprises particle sizes that are smaller than the wavelength of visible light (400-750 nm), and also includes particle sizes that are greater than the maximum wavelength. For such distributions, light scattering involves both Rayleigh and Mie scattering, for example.

The particles 322 can be configured in many ways, and may comprise an optically transmissive material or a material with absorbance of light energy. In some embodiments, the particles 322, which may be microspheres, absorb visible light in the range of 400 nm to 750 nm. As light from the ambient environment is transmitted through the light scattering zone, a portion of the scattered light may be absorbed by the particles 322, rendering the appearance of this zone gray.

The particles 322 may comprise any suitable refractive index and the electro-switchable material, such as a liquid crystal material 320, may comprise any suitable refractive index. In some embodiments, the particles 322 comprise a refractive index within a range from 1.5 to 1.7, and the refractive index may correspond to a sodium D line at approximately 589 nm. In some embodiments, the liquid crystal material 320 comprises a refractive index in a non-active state (e.g. without voltage to the electrodes) within a range from 1.50 to 1.65, and the liquid crystal material refractive index is configured to change by an amount within a range from about 0.1 to about 0.25 with application of the voltage between the electrodes, for example change by about 0.15.

The particles 322 may comprise one or more of ion doped glasses, polyacrylates, polymethacrylates, polyaromatics, polysulfones, polyimides, polyamides, polyethers, polyether ketones, or polycyclic olefins.

In some embodiments, the liquid crystal material 320 comprises a substantially transparent material with a glass transition temperature below −10 degrees C. and a melting point above 100 degrees C. The liquid crystal material 320 may comprise one or more of a nematic phase, a cholesteric phase or smectic phase. The liquid crystal material may comprise a cholesteric liquid crystal with a dichroic dye. The dichroic dye may have an orientation dependent absorption of light or it may have an orientation dependent average refractive index. Both such properties of dichroic dyes may be used in construction of the electroactive element disclosed herein.

In some embodiments, the electroactive component 112 described herein may comprise liquid crystal that is patterned in order to project patterns of scatter that cover a desired range of spatial frequencies. For example, the range of spatial frequencies may be in the range of 1 line pair per millimeter ("lp/mm") to 10 lp/mm, equivalent to spatial frequencies involved mostly in shape recognition and detection of motion. In some embodiments, scattering of incoming light is independent of spatial frequency of the image that may be formed by said light. Although reference is made to particles 322 within a liquid crystal material, holographic or other structures may be used to provide light with an appropriate spatial frequency distribution for therapy. In some embodiments, the structure comprises a periodic structure immersed in the LC material 320, such that the structure provides spatial frequencies when the refractive index of the structure does not substantially match the refractive index of the LC material 320, and provides substantially transparent vision correction when the indices substantially match as described herein.

The electroactive component 112 can be configured in many ways. For example, the electroactive component 112 may comprise an assembly configured for placement on the lens 102 at a suitable time during manufacture of the lens 102. For example, the component 112 may comprise a stand-alone component 112 configured for placement on the lens 102, either before or after the curved refractive surface has been ground on the lens 102. The circuitry 130 can be coupled to the electroactive component 112 with suitable connectors and mounted on the support such as an eyeglass frame 104 at a suitable location as described herein.

Figure 4:
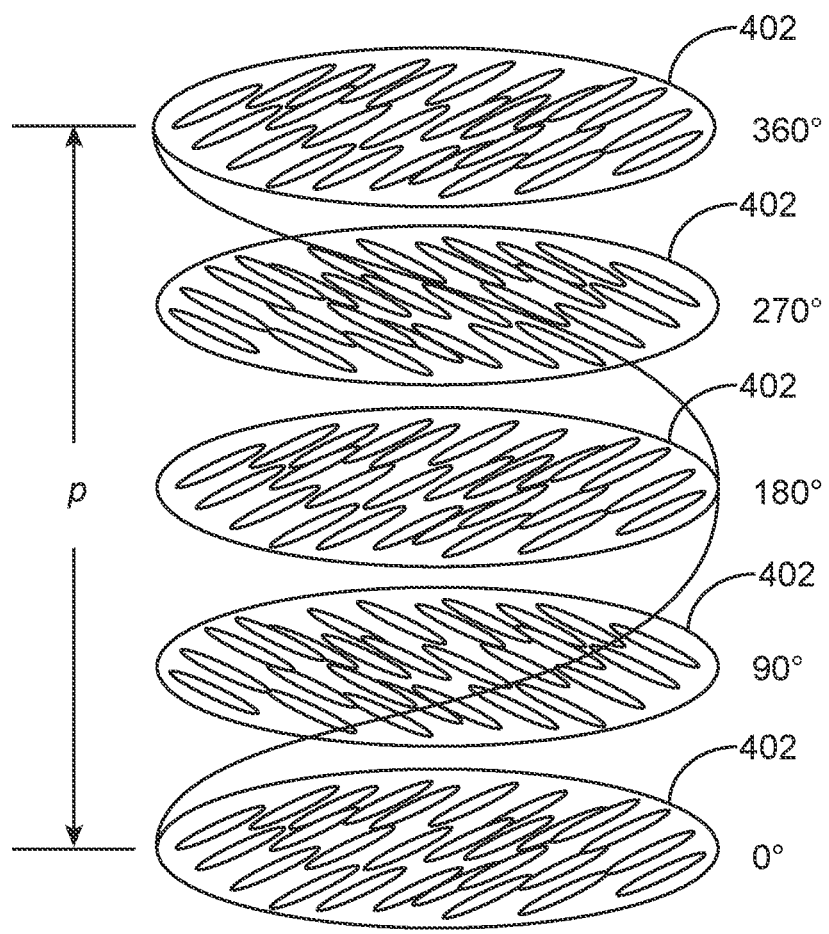
FIG. 4 shows cholesteric liquid crystals with and without dopants to develop polarization independent medium with a switchable refractive index, in accordance with some embodiments.

FIG. 4 shows cholesteric liquid crystals 402, which are a type of liquid crystal material 320, with and without dopants to develop polarization independent medium with a switchable refractive index. The optical rotation angles are shown from 0 to 360 degrees for the liquid crystals over a length of a pitch ("p"). In some embodiments, this approach utilizes cholesteric liquid crystal (CLC) 402 to match the refractive index of the embedded particles. In some embodiments, a single layer of CLC 402 is polarization insensitive when p≤l in the off state and intrinsically polarization insensitive in the on state, where l is the distance between the electrodes 308. Although the switchable zone 110 can be configured in many ways, in some embodiments, CLC device comprises only 2 electrical connections/device.

While the CLC 402 can be configured in many ways, in some embodiments the CLC 402 comprises a chiral dopant to provide a pitch of approximately 1.4 microns for polarization insensitivity. While the refractive index of the LC material can be configured on many ways, in some embodiments, the LC material, e.g. CLC material 402, is configured to switch between two refractive indices, e.g. 1.667 ($n_e$) and 1.53 ($n_o$), where ne is the extraordinary refractive index no is the ordinary refractive index.

Table 1 shows liquid crystal formulations commercially available from Merck and their material properties such as refractive indices.

| LC | $n_e$ | $n_o$ | birefringence | $n_{avg}$ | $T_C$, °C. | Diel. anisotropy | Viscosity, mPa · s |
|---|---|---|---|---|---|---|---|
| MDA-98-1602/PO | 1.7779 | 1.5113 | 0.2666 | 1.6446 | 109 | 11.9 | 203 |
| MLC-2134 | 1.7691 | 1.5106 | 0.2585 | 1.63985 | 112 | — | — |
| MLC-2132 | 1.7657 | 1.5094 | 0.2563 | 1.63755 | 114 | 10.7 | — |
| MLC-6080 | 1.71 | 1.5076 | 0.2024 | 1.6088 | 95 | 7.2 | 157 |
| MLC-2136 | 1.7162 | 1.5038 | 0.2124 | 1.61 | 92 | 7.1 | 134 |
| BL 006 | 1.816 | 1.53 | 0.286 | 1.673 | 113 | 17.3 | 71 |
| DIC/PHC | 1.765 | 1.514 | 0.251 | 1.6395 | 99.4 | 16.2 | 43.1 |
| E7 | 1.7394 | 1.5224 | 0.217 | 1.6309 | 61 | 13.2 | — |
| E44 | 1.7859 | 1.52778 | 0.25812 | 1.65684 | — | — | — |
| MDA-05-2986 | 1.781 | 1.5125 | 0.2685 | 1.64675 | — | — | — |

Although reference is made to specific liquid crystal materials, one of ordinary skill in the art will recognize that many adaptations and variations can be made.

FIGS. 5A, 5B, 6A, and 6B show index matching between liquid crystals and particles, in accordance with some embodiments.

Figure 5A:
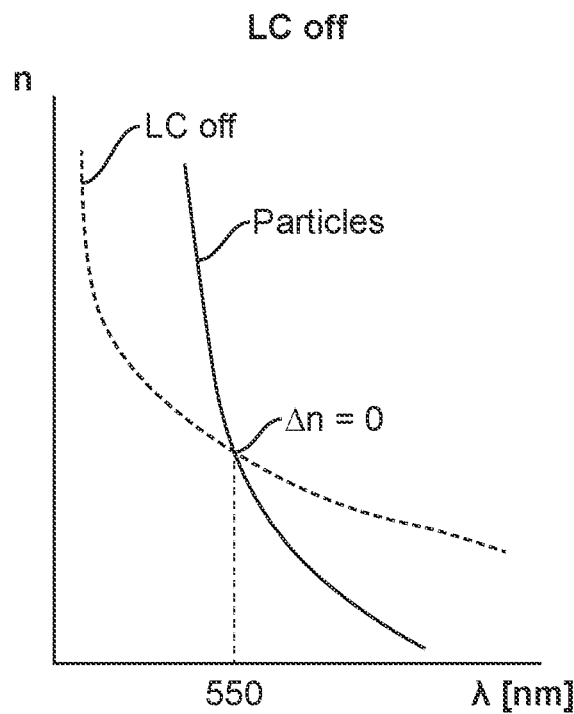
FIG. 5A shows index matching between particles and a liquid crystal (LC) material for at least one wavelength of light with the LC electrodes off, in accordance with some embodiments.
Figure 5B:
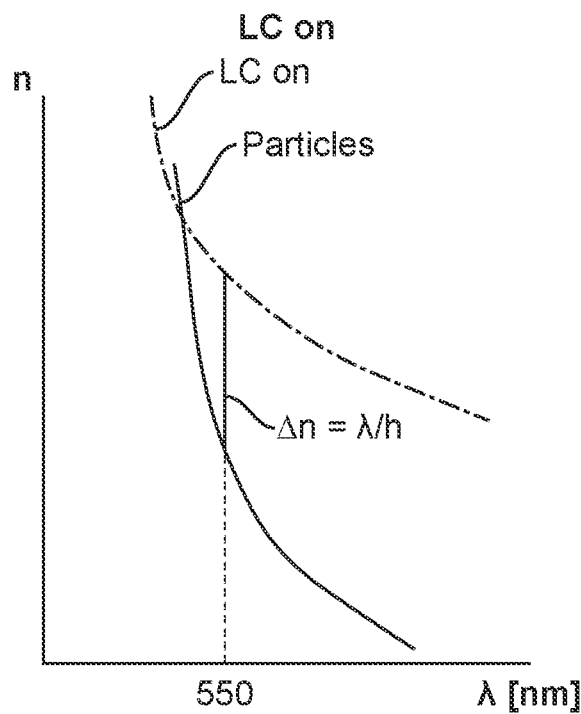

FIG. 5A shows index matching between particles and an LC material for at least one wavelength of light with the LC electrodes, such as electrodes 208, off. For at least one wavelength, e.g. 550 nm, the index of refraction of the LC material matches the index of refraction of the particles such that delta n=0. As shown in FIG. 5A the index of refraction of the LC material differs from the index of refraction ("n") of the particles. FIG. 5B shows a change in the index of the LC material as in FIG. 5A with the LC electrodes on. The electrode voltage and corresponding electric field results in a difference in the index of refraction between the particles at the wavelength where the indices matched, e.g. 550 nm in FIG. 5A. The difference in the index of refraction ($\Delta n$) at 550 nm is equal to $\Delta\lambda/h$, h being the director as known to one of ordinary skill in the art. In some embodiments, even with the electrode voltage, the indices of refraction may match at another wavelength. Although this configuration may be less than ideal in some embodiments, work in relation to the present disclosure suggests that such a configuration may provide therapeutic benefit.

Figure 6A:
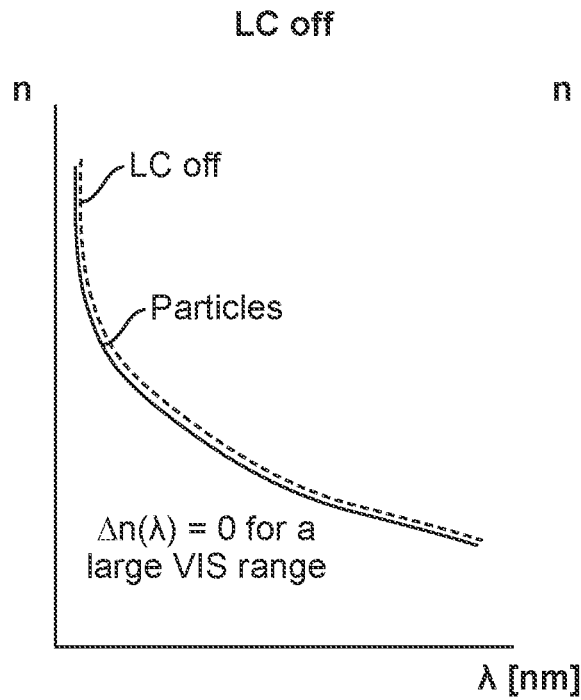
FIG. 6A shows index matching between particles and the LC material over a range of wavelengths with the LC electrodes off, in accordance with some embodiments.

FIG. 6A shows index matching between particles and the LC material over a range of wavelengths with the LC electrodes off. In some embodiments, the index of refraction of the LC material is within 0.02 of the index of refraction of the particles over large range of visible wavelengths of light, such as a range of wavelengths from 400 nm to 750 nm. In this configuration, the electroactive layer is substantially transparent, for example when the layer has been switched off.

Figure 6B:
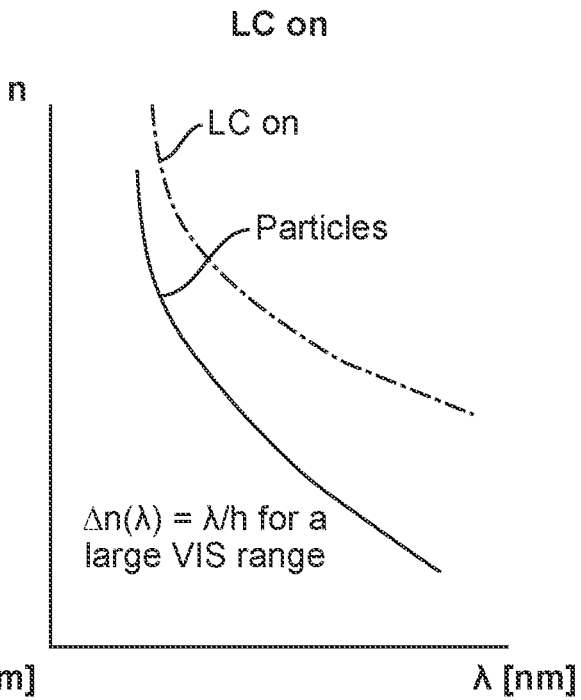

FIG. 6B shows a decreased index matching between particles and the LC material over a range of wavelengths as in FIG. 6B with the LC electrodes on. There is a significant different in the index of refraction between the LC material and the particles. In this configuration, the electroactive layer comprises a translucent material which appears hazy when an object is viewed therethrough, so as to provide light scatter and therapeutic treatment of refractive error as described herein. In some embodiments, the index of refraction of the particles differs from the index of refraction of the layers by at least 0.05 over a range of wavelengths from about 400 nm to about 750 nm.

The optical properties shown in FIGS. 6A and 6B are closer to optimal and may provide therapeutic treatment with scattered light at a first time and allow a wearer to view crisp clear objects through the lens 102 at a second time as described herein, for example with a visual acuity of 20/20 or better (metric 6/6).

Although FIGS. 5A, 5B, 5C, and 6B refer to electrodes switched on for increased scattering and switched off for decreased scattering, this can be reversed in alternative embodiments, such that the light scatters more with the electrodes off than with the electrodes on, for example by using particles with a different index of refraction.

Figure 7:
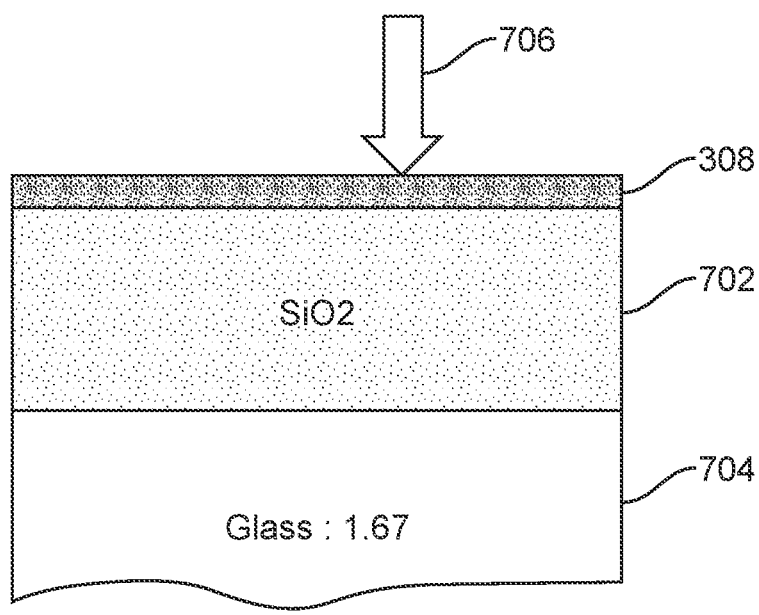
FIG. 7 shows structure of an electroactive switchable layer, in accordance with some embodiments.

FIG. 7 shows structure of an electroactive switchable layer 306. In some embodiments a potential difference (Voltage) is delivered by a transparent electrode 308, e.g., Indium Tin Oxide (ITO). The electrode may comprise a thickness within a range from 20 nm to 200 nm. The metal may be deposited on an aligned layer of a substrate, such as an SiO2 layer 702, that has a thickness within a range from 5 nm to 30 nm. In some embodiments, alignment of the SiO2 layer 702 is achieved by oblique deposition. In some embodiments, the alignment of the SiO2 layer 702 drives alignment of the LC molecules at a lower voltage.

While the coating thickness can be configured in many ways, in some embodiments the thickness is determined with optimization. For example, simulations can be performed to optimize the transmission with ITO-SiO2 coatings. For ITO-SiO2 layers on glass substrate 704, work in relation to the present disclosure suggests that a thicknesses of 20 nm and 230 nm, respectively, can provide maximum transmission for light 706, which may be light at 550 nm, at normal incidence. While the transmission can be any suitable amount, e.g. 80% or more, the calculated transmission can be approximately 93.35% at normal incidence for an air/ITO interface, for example. Although reference is made to SiO2 (glass) as a substrate material having an index of refraction of 1.67, the substrate material may comprise any suitable material with any suitable refractive index, such as glass with a different index of refraction, or plastic, for example.

Although reference is made to the treatment of refractive error such as myopia with light scattering, components and embodiments of the present disclosure are well suited for use to treat refractive error with an image that is focused anterior or posterior to the retina so as to provide a defocused image on the retina and stimulate a change to one or more of the axial length of the eye or a choroidal thickness of the eye. Work in relation to the present disclosure suggests that an image focused in front of the retina or behind the retina can provide a suitable stimulus for changing refractive error of the eye by changing one or more of the axial length or the choroidal thickness of the eye. In accordance with the present disclosure, the liquid crystal material and one or more components as described herein can be combined with one or more of an optical surface profile or an electrode profile to provide a change in optical power to the eye.

In some embodiments, the switchable zone comprises a liquid crystal material configured to vary an optical power of the switchable zone and wherein the optical power in the first configuration differs from an optical power of the second configuration.

In some embodiments, the switchable layer comprises a polarization insensitive switchable optic providing a switchable power, e.g. plus power. The switchable power can be provided by a surface relief profile or a patterned electrode. In some embodiments, the surface relief profile comprises a diffraction pattern that is etched on the surface of the wall of the electro-active layer, providing optical power, e.g. positive optical power. In some embodiments, the power is activated by creating a mismatch of refractive indices of the liquid crystal material and the wall material which may comprise any suitable material such as glass or plastic. The optical power may comprise any suitable optical power, such as positive or negative optical power, e.g. a positive optical power of up to +6D. This optical power can be generated with an index difference between the liquid crystal material and the wall material within a range from 0.1 to 0.2, for example approximately 0.15, with suitable liquid crystal materials such as commercially available liquid crystal materials.

Figure 8A:
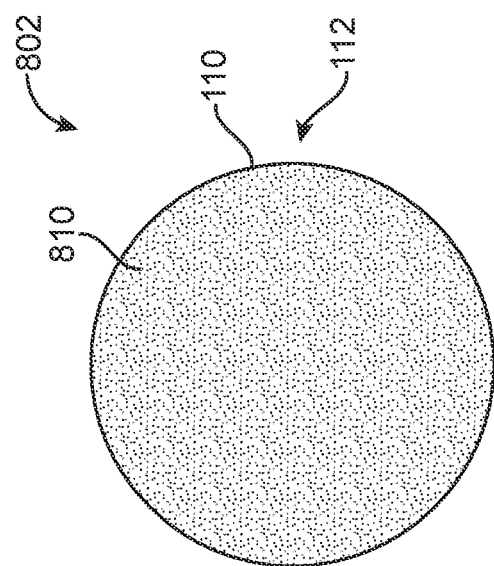
FIG. 8A shows a peripheral field switchable optic, in accordance with some embodiments.

FIG. 8A shows a peripheral field switchable optic 800 suitable for incorporation as the switchable zone of the apparatus as described herein. The optic 810 comprises a switchable zone 110 and an electroactive component 112. The electroactive component located within the switchable zone 110 comprises a plurality of switchable optical elements 810, e.g. pixels, each of which is configured to provide optical power in a first configuration and to provide substantially no optical power in a second configuration. A clear zone is located at the center of the optic as described herein, in which the switchable zone 110 is located around the clear zone, although other configurations are possible and contemplated in accordance with the present disclosure. The switchable zone 110 can be located away from the center of the optic to stimulate the peripheral retina as described herein. Light transmitted from a distant object through the optical elements 810 is generally directed toward the peripheral retina as described herein.

Figure 8B:
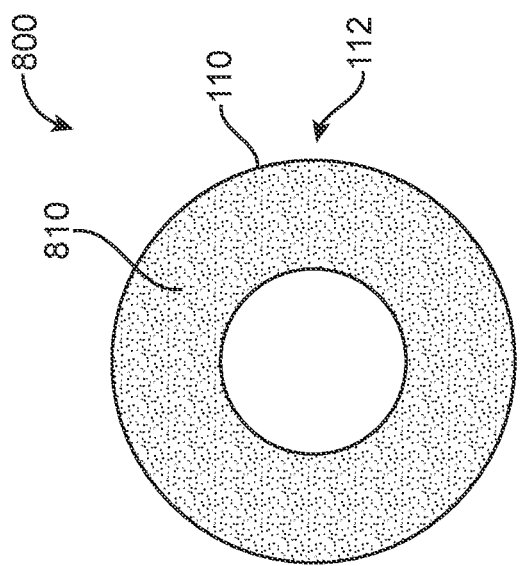
FIG. 8B shows a full field switchable optic, in accordance with some embodiments.

FIG. 8B shows a full field switchable optic 802, in accordance with some embodiments. Work in relation to the present disclosure suggest that defocused stimulation of the peripheral retina can be combined with defocused stimulation of the fovea and macula, for example. In some embodiments, the switchable zone 110 and electroactive component 112 comprising optical elements 810 extend across the central zone of the lens, and the optic is configured to provide optical power for treatment for a limited time. Although this configuration may make the eye myopic or hyperopic for a limited time during therapy, e.g. 1 to 2 hours, this may be helpful for treatment. The electroactive components 112 located within the switchable zone 110 comprises a plurality of switchable optical elements 810, e.g. pixels, each of which is configured to provide optical power in a first configuration and to provide substantially no optical power in a second configuration, e.g. for normal viewing.

The switchable zone 110 comprising electroactive component 112 can be configured with addressable optical elements, e.g. pixels, such that any or all pixels may be activated simultaneously. This approach can provide selective regions of defocus on the lens and corresponding regions of the retina, and can provide pan-retinal or peripheral defocus, such as myopic defocus, and combinations thereof. Although pan retinal defocus providing stimulation of the macula and peripheral regions of the retina may inhibit clear central vision during defocus for treatment, work in relation to the present disclosure suggests that treatment times may be sufficiently short in duration, such that the patient can be treated effectively.

With the addressable optical elements, e.g. pixels, the regions of defocus can be effected with a processor as described herein, so as to provide treatment to appropriate regions of the retina, which may comprise one or more of peripheral or macular regions of the retina.

In some embodiments, the switchable zone comprises a plurality of switchable lenslets to vary the optical power, in which the plurality switchable lenslets comprising one or more of an optical surface profile or an electrode profile to vary the optical power and defocus light in a first configuration, e.g. the on configuration.

In some embodiments, the switchable zone comprises one or more optical structures comprising an optical surface profile to blur the viewed images in response to a difference between an index of refraction of the one or more optical structures and an index of refraction of the electroactive material.

In some embodiments, the optical surface profile comprises a diffractive optic profile to provide optical power in response to the difference in the index of refraction of the one or more optical structures and the index of refraction of the electroactive material.

In some embodiments the diffractive optic profile comprises a plurality of echelletes.

In some embodiments the switchable zone is configured to focus an image of an object anterior or posterior to the retina in the first configuration and to focus the image of the object onto the retina in the second configuration.

Figure 9:
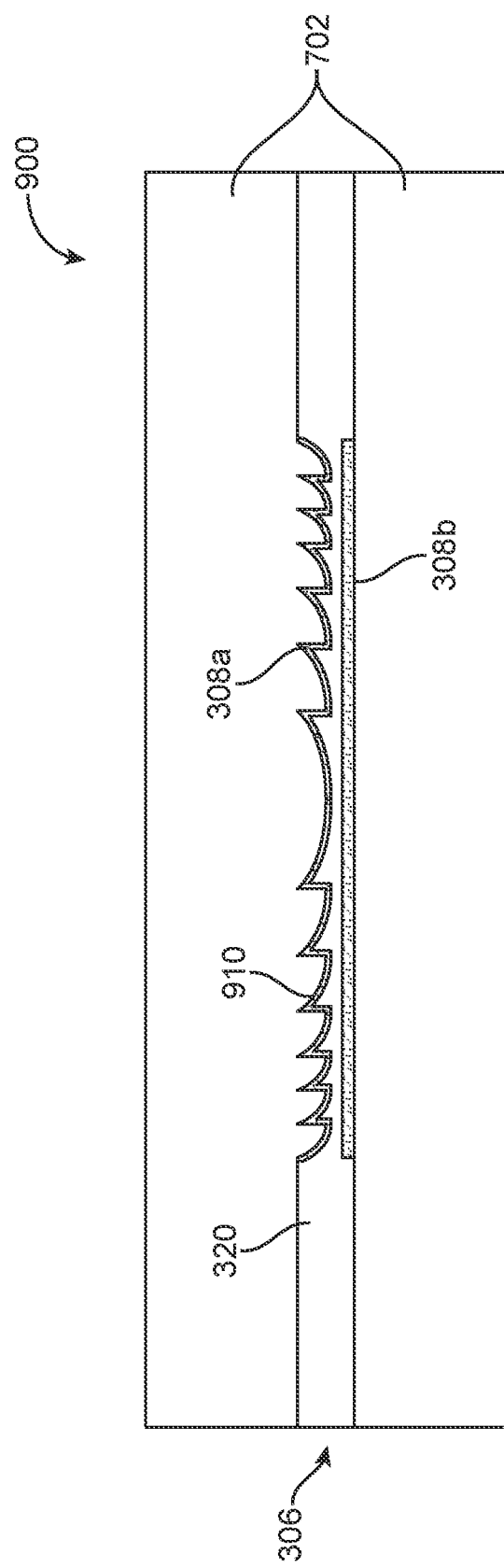
FIG. 9 shows an optical surface profile in a substrate material to provide optical power, in accordance with some embodiments.

FIG. 9 shows an optical element 900, e.g. a pixel, comprising an optical surface relief profile 910 in a substrate material to provide switchable optical power. The surface relief profile can be formed in an optically transmissive substrate material, e.g. a transparent substrate material as described herein. The optical element 900 comprises a liquid crystal material as described herein. A first electrode 308a extends along the surface relief profile 910 formed in a first substrate 702, and a second electrode 308b extends along a second substrate 702, e.g. a substantially planar substrate. The liquid crystal material can undergo a change in index as described herein, in order to provide optical power with the surface relief profile. While the surface relief profile 910 can be configured in many ways, in some embodiments, the surface relief profile comprises a diffractive optical surface. The diffractive optical surface may comprise a plurality of echelletes. The plurality of echelletes can be configured provide a change in phase to the light passing through the echelletes in order to provide optical power in response to a difference between the index of refraction of the substrate material and the liquid crystal material as described herein.

While the surface relief optical element can be configured in many ways, in some embodiments each optical element comprises two electrodes, in which the first electrode and the second electrode extends substantially continuously over an area of each of the respective substrate. While the electrodes can be deposited in many ways, in some embodiments the electrodes are deposited without lithography, e.g. with thin film deposition. The surface relief optical element can be configured to provide high optical efficiency, e.g. 90% or more of the light transmitted through the element forming an image with the intended optical power anterior or posterior to the retina. While the surface relief profile can be formed in many materials, in some embodiments the surface relief profile extends along a plastic surface, although other materials can be used as described herein. The surface relief profile can be formed on a flat surface, or on a curved surface. In some embodiments the surface relief profile is formed on a flat surface, the electrodes and liquid crystal material and substrates adhered together, and then the assembly is placed on a curved surface.

In some embodiments, a patterned electrode layer is deposited on the wall of the electro-active optical layer. The patterned electrode can be electrically activated to create a pattern of voltage difference that in turn produces a pattern of refractive index difference within the liquid crystal material this. This approach creates a diffractive optic that can be switched off or on. The optical power may comprise any suitable optical power, such as positive or negative optical power, e.g. a positive optical power of up to +6D. This optical power can be provided an index difference within a range from 0.1 to 0.2, for example approximately 0.15, with suitable liquid crystal materials such as commercially available liquid crystal materials as described herein.

FIG. 10A shows a front view of an optical element 1000 comprising an electrode profile to provide optical power, and FIG. 10B shows a side view of the electrode profile of FIG. 10A. The electrode profile can generate differences in the index of refraction of the liquid crystal material between the first substrate and the second substrate, in order to provide diffraction and corresponding optical power related to the diffractive orders, e.g. +1, +2, etc. and −1, −2, etc. Although the one or more electrodes on one or more substrates can be configured in many ways, in some embodiments, the one or more electrodes on one of the substrates comprises a plurality of traces disposed in a generally annular pattern, corresponding to a spherical optical power. The one or more electrodes may comprise a plurality of traces, 308a-1, 308a-2 and 308a-3. One or more gaps 307a-1, 307a-2, can extend between the traces on the first substrate 702. For example, gaps 307a-1 and 307a-2 extend between traces 308a-1 and 308a-2, and 308a-2 and 308a-3, respectively. In some embodiments, a second electrode 308b is located on a second substrate, in which the second electrode comprises a substantially continuous electrode extending along a surface of the second substrate. The gaps between the electrode traces 308a-1, 308a-2 and 308a-3 correspond to regions of decreased electric field strength within the liquid crystal material, so as to define regions of decreased change in refractive index in response to the voltage between the electrode 308a on the first substrate 702 and the electrode 308b on the second substrate 702.

The optical elements that provide refractive power, e.g. pixels, can be dimensioned in many ways. The surface relief profile optical elements and electrode profile optical elements may comprise similar dimensions. With spectacle lenses, each of the optical elements may comprise a maximum dimension across, e.g. a diameter, within a range from about 3 mm to about 10 mm, for example. The lens, such as a spectacle lens, on which the optical elements are placed can have a maximum distance across within a range from about 60 mm to about 90 mm, for example within a range from about 70 mm to about 80 mm. The switchable zone 110 comprising electroactive component 112 may comprise any suitable number of switchable optical elements, for example within a range from about 10 to about 1000 switchable optical elements, for example within a range from about 40 to 500 switchable optical elements. Although the voltage applied to each switchable optical element may comprise a substantially fixed voltage to provide a substantially fixed change in optical power, in some embodiments, a continuously variable voltage can be applied to the optical elements to provide a continuously variable change refractive index to provide a continuously variable change in optical power for each of the plurality of optical elements.

In some embodiments, the switchable zone comprises an electrode profile to blur the viewed images with diffraction in response to a difference between a first index of refraction of the electroactive material at first location and a second index of refraction of the electroactive material at a second location, the first location closer to the electrode than the second location.

In some embodiments, the pattern comprising the electrode profile is configured to provide optical power to the switchable zone to focus light away from the retina in the first configuration, e.g. the on configuration. In some embodiments, the pattern comprising the electrode profile is configured to generate positive optical power and negative optical power with diffraction related to the difference between the first index at the first location and the second index at the second location.

In some embodiments, the pattern comprising the electrode profile comprises a plurality of gaps corresponding to the second location of the electroactive material.

While the electrode can be configured in many ways, in some embodiments the electrode profile comprises an electrode trace extending along a substrate corresponding to the first location of the electroactive material and the electrode profile comprises a plurality of gaps defined by the traces of the electrode.

In some embodiments, the second location of the electroactive material comprises a plurality of second locations and the plurality of gaps corresponds to the plurality of second locations of the electroactive material.

With reference to the circuitry described herein, in some embodiments the circuitry is configured to vary an amount of optical power of the switchable zone and optionally wherein the first configuration comprises a plurality of configurations each configured to provide a different amount of optical power.

The electroactive material can be configured in many ways to provide the switchable optical elements. In some embodiments, the electroactive material comprises a liquid crystal material, the liquid crystal material comprising a refractive index within a range from 1.5 to 1.65 and the liquid crystal material is configured to change the refractive index by an amount within a range from 0.10 to 0.25.

In some embodiments, the switchable zone comprises one or more of an optical surface profile or an electrode profile on a surface of a substantially transparent substrate material. In some embodiments, the substrate material comprises a refractive index within a range from 1.5 to 1.7 and optionally the refractive index corresponds to the sodium D line at approximately 589 nm. In some embodiments, the substrate material comprises one or more of ion doped glasses, polyacrylates, polymethacrylates, polyaromatics, polysulfones, polyimides, polyamides, polyethers, polyether ketones, or polycyclic olefins.

In some embodiments, the liquid crystal material is switchable from a first refractive index in the first configuration to provide optical power to a second refractive index in the second configuration to substantially transparently transmit light through the substrate material and wherein the second refractive index is closer to a refractive index of the substrate material in the second configuration.

In some embodiments, the first refractive index differs from the refractive index of the substrate material by at least 0.05 to provide optical power and the second refractive index differs from the refractive index of the substrate material by no more than 0.02 to substantially transparently transmit light.

In some embodiments, the liquid crystal material is configured to provide a change in refractive index within a range from 0.10 to 0.25. In some embodiments, the liquid crystal material comprises a transparent material with a glass transition temperature below −10 degrees C. and a melting point above 100 degrees C. and optionally the liquid crystal material comprises one or more of a nematic phase, a cholesteric phase or smectic phase.

With respect to the electroactive component for use with a lens, the electroactive layer may comprise an adhesive layer to adhere to a lens, a scratch resistant layer and a switchable layer between the adhesive layer and the scratch resistant layer. The switchable layer may comprise a liquid crystal material and one or more of particles, an optical surface profile or an electrode profile.

Although reference is made to switchable optical elements comprising a surface relief profile or an electrode with a shape pattern, other approaches can be used in accordance with the present disclosure. For example, the switchable optical component may comprise one or more liquid lenses arranged to provide a change in optical power. For example, the liquid lenses can be inflated with a liquid to provide an increase in optical power, and the lenses can be located similarly to the switchable optical elements comprising a surface relief profile or a shaped electrode profile pattern as described herein. In some embodiments, the switchable optical power, such as plus optical power can be created by adding an optical layer that comprises a liquid lens. The liquid lens can be activated to provide any suitable optical power, such as a plus power of up to 4.0D, and can be either manually adjusted in power, or it may be driven electrically.

One of ordinary skill in the art can design the surface relief profiles and shaped electrodes with suitable software, in accordance with the present disclosure. For example Zemax optical design software can be used to design refractive components such as lenses as describe herein. Also by way of example, virtual lab software or MatLab software can be used to design the surface relief profile and the profile of the patterned electrode, and model the changes in refractive index in response to voltages and various configurations of the components as described herein.

In embodiments which comprise a clear central optical zone, an optical power of the clear optical zone may remain substantially fixed, e.g. constant, for first configuration, e.g. on, and the second configuration of the switchable zone, e.g. off.

As described herein, the computing devices and systems described and/or illustrated herein broadly represent any type or form of computing device or system capable of executing computer-readable instructions, such as those contained within the modules described herein. In their most basic configuration, these computing device(s) may each comprise at least one memory device and at least one physical processor.

The term "memory" or "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices comprise, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "processor" or "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors comprise, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor. The processor may comprise a distributed processor system, e.g. running parallel processors, or a remote processor such as a server, and combinations thereof.

Although illustrated as separate elements, the method steps described and/or illustrated herein may represent portions of a single application. In addition, in some embodiments one or more of these steps may represent or correspond to one or more software applications or programs that, when executed by a computing device, may cause the computing device to perform one or more tasks, such as the method step.

In addition, one or more of the devices described herein may transform data, physical devices, and/or representations of physical devices from one form to another. Additionally or alternatively, one or more of the modules recited herein may transform a processor, volatile memory, non-volatile memory, and/or any other portion of a physical computing device from one form of computing device to another form of computing device by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media comprise, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

A person of ordinary skill in the art will recognize that any process or method disclosed herein can be modified in many ways. The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed.

The various exemplary methods described and/or illustrated herein may also omit one or more of the steps described or illustrated herein or comprise additional steps in addition to those disclosed. Further, a step of any method as disclosed herein can be combined with any one or more steps of any other method as disclosed herein.

The processor as described herein can be configured to perform one or more steps of any method disclosed herein.

Alternatively or in combination, the processor can be configured to combine one or more steps of one or more methods as disclosed herein.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and shall have the same meaning as the word "comprising.

The processor as disclosed herein can be configured with instructions to perform any one or more steps of any method as disclosed herein.

It will be understood that although the terms "first," "second," "third", etc. may be used herein to describe various layers, elements, components, regions or sections without referring to any particular order or sequence of events. These terms are merely used to distinguish one layer, element, component, region or section from another layer, element, component, region or section. A first layer, element, component, region or section as described herein could be referred to as a second layer, element, component, region or section without departing from the teachings of the present disclosure.

As used herein, the term "or" is used inclusively to refer items in the alternative and in combination.

As used herein, characters such as numerals refer to like elements.

The present disclosure includes the following numbered clauses.

Clause 1. An apparatus to treat refractive error of an eye, the apparatus comprising: a lens comprising an optical zone; and a switchable zone extending around the optical zone, wherein the switchable zone comprises an electroactive material switchable between a first configuration to substantially scatter or defocus light and second configuration to substantially transparently transmit light through the lens.

Clause 2. The apparatus of clause 1, wherein the switchable zone is substantially translucent in the first configuration and substantially transparent in the second configuration.

Clause 3. The apparatus of clause 1, wherein images viewed through the switchable zone in the first configuration appear blurry.

Clause 4. The apparatus of clause 1, wherein an optical power of the optical zone remains substantially fixed for the first configuration and the second configuration of the switchable zone.

Clause 5. The apparatus of clause 3, wherein the switchable zone comprises particles to blur the viewed images in response to a difference between an index of refraction of the particles and the electroactive material.

Clause 6. The apparatus of clause 3, wherein switchable zone comprises a liquid crystal material configured to vary an optical power of the switchable zone and wherein the optical power in the first configuration differs from an optical power of the second configuration.

Clause 7. The apparatus of clause 6, wherein the switchable zone comprises a plurality of switchable lenslets to vary the optical power, the plurality switchable lenslets comprising one or more of an optical surface profile or an electrode profile to vary the optical power and defocus light in the first configuration.

Clause 8. The apparatus of clause 3, wherein the switchable zone comprises one or more optical structures comprising an optical surface profile to blur the viewed images in response to a difference between an index of refraction of the one or more optical structures and an index of refraction of the electroactive material.

Clause 9. The apparatus of clause 7, wherein the optical surface profile comprises a diffractive optic profile to provide optical power in response to the difference in the index of refraction of the one or more optical structures and the index of refraction of the electroactive material.

Clause 10. The apparatus of clause 8, wherein the diffractive optic profile comprises a plurality of echelletes.

Clause 11. The apparatus of clause 8, wherein switchable zone is configured to focus an image of an object anterior or posterior to the retina in the first configuration and to focus the image of the object onto the retina in the second configuration.

Clause 12. The apparatus of clause 3, wherein the switchable zone comprises an electrode profile to blur the viewed images with diffraction in response to a difference between a first index of refraction of the electroactive material at first location and a second index of refraction of the electroactive material at a second location, the first location closer to the electrode than the second location.

Clause 13. The apparatus of clause 11, wherein electrode profile is configured to provide optical power to the switchable zone to focus light away from the retina in the first configuration.

Clause 14. The apparatus of clause 12, wherein electrode profile is configured to generate positive optical power and negative optical power with diffraction related to the difference between the first index at the first location and the second index at the second location.

Clause 15. The apparatus of clause 11, wherein electrode profile comprises a plurality of gaps corresponding to the second location of the electroactive material.

Clause 16. The apparatus of clause 14, wherein electrode profile comprises an electrode trace extending along a substrate corresponding to the first location of the electroactive material and wherein the electrode profile comprises a plurality of gaps defined by the traces of the electrode Clause 17. The apparatus of clause 15, wherein the second location of the electroactive material comprises a plurality of second locations and wherein the plurality of gaps corresponds to the plurality of second locations of the electroactive material.

Clause 18. The apparatus of clause 1, wherein the lens comprises an optical power, the optical zone comprising the optical power and wherein the switchable zone is located on the lens to transmit light with the optical power in the second configuration.

Clause 19. The apparatus of clause 17, wherein the lens comprises a first side and a second side, the switchable zone located on the first side, the second side comprising a curvature to provide a majority of the optical power of the lens.

Clause 20. The apparatus of clause 1, wherein the switchable zone comprises the first configuration when a voltage is applied to the zone and the second configuration without the voltage applied to the zone.

Clause 21. The apparatus of clause 1, wherein the switchable zone comprises the second configuration when a voltage is applied to the zone and the first configuration without the voltage applied to the zone.

Clause 22. The apparatus of clause 1, wherein switchable zone comprises an annular zone.

Clause 23. The apparatus of clause 1, wherein the optical zone comprises a central optical zone.

Clause 24. The apparatus of clause 1, wherein the switchable zone is located on a portion of the lens configured to correct the refractive error of the eye.

Clause 25. The apparatus of clause 1, wherein the optical zone is configured to correct a refractive error of the eye.

Clause 26. The apparatus of clause 1, wherein the optical zone is sized to transmit light at an angle within range from 12 degrees to 20 degrees with reference to an entrance pupil of the eye.

Clause 27. The apparatus of clause 25, wherein the angle is within a range from 14 to 16 degrees.

Clause 28. The apparatus of clause 25, wherein the angle comprises a half-angle.

Clause 29. The apparatus of clause 1, wherein the switchable zone is sized to transmit light at an angle within range from 15 degrees to 50 degrees with reference to an entrance pupil of the eye.

Clause 30. The apparatus of clause 28, wherein the switchable zone comprises an inner boundary and an outer boundary, the inner boundary corresponding to an inner angle within a range from 15 degrees to 20 degrees with reference to the entrance pupil of the eye, the outer boundary corresponding to an outer angle within a range from 25 degrees to 50 degrees with reference to the entrance pupil of the eye.

Clause 31. The apparatus of clause 29, wherein the lens is mounted on an eyeglass frame to provide a vertex distance to a cornea of the eye, the vertex distance, the inner boundary and the outer boundary dimensioned to provide the inner angle and the outer angle with reference to the entrance pupil of the eye.

Clause 32. The apparatus of clause 1, wherein switchable zone comprises a liquid crystal material and particles within the liquid crystal material and wherein the particles scatter light a greater amount of in the first configuration than in the second configuration.

Clause 33. The apparatus of clause 31, wherein particles comprise microspheres.

Clause 34. The apparatus of clause 31, wherein particles comprise a diameter within a range from 1 micron to 1000 microns and optionally within a range from 5 microns to 500 microns and optionally within a range from 10 microns to 250 microns.

Clause 35. The apparatus of clause 31, wherein the particles comprise a maximum distance across within a range from 1 micron to 1000 microns and optionally within a range from 5 microns to 500 microns and optionally within a range from 10 microns to 250 microns.

Clause 36. The apparatus of clause 31, wherein the particles comprise a size distribution with a majority of particles at least 5 microns across and no more than 500 microns across and optionally at least 10 microns and no more than 250 microns and optionally wherein the particles comprise spheres and the dimensions comprise diameters.

Clause 37. The apparatus of clause 31, wherein the particles comprise a distribution of particle sizes configured to scatter light into an entrance pupil of the eye with a first amount at 400 nm and a second amount at 750 nm, the first amount within 25% of the second amount.

Clause 38. The apparatus of clause 36, wherein the distribution of particles is configured to scatter light substantially uniformly over a range of wavelengths from 400 nm to 750 nm and wherein an amount of scatter over the range varies no more than about 25%.

Clause 39. The apparatus of clause 31, wherein the liquid crystal material comprises a refractive index within a range from 1.5 to 1.65 and wherein the liquid crystal material is configured to change the refractive index by an amount within a range from 0.10 to 0.25.

Clause 40. The apparatus of clause 31, wherein the particles comprise a refractive index within a range from 1.5 to 1.7 and optionally wherein the refractive index corresponds to the sodium D line at approximately 589 nm.

Clause 41. The apparatus of clause 31, wherein the particles comprise one or more of ion doped glasses, polyacrylates, polymethacrylates, polyaromatics, polysulfones, polyimides, polyamides, polyethers, polyether ketones, or polycyclic olefins.

Clause 42. The apparatus of clause 31, wherein the liquid crystal material is switchable from a first refractive index in the first configuration to substantially scatter light to a second refractive index in the second configuration to substantially transparently transmit light and wherein the second refractive index is closer to a refractive index of the particles to decrease light scatter from the particles in the second configuration.

Clause 43. The apparatus of clause 41, wherein the first refractive index differs from the refractive index of the particles by at least 0.05 to substantially scatter light and the second refractive index differs from the refractive index of the particles by no more than 0.02 to substantially transparently transmit light.

Clause 44. The apparatus of clause 31, wherein the liquid crystal material is configured to provide a change in refractive index within a range from 0.10 to 0.25.

Clause 45. The apparatus of clause 31, wherein the liquid crystal material comprises a transparent material with a glass transition temperature below −10 degrees C. and a melting point above 100 degrees C. and optionally wherein the liquid crystal material comprises one or more of a nematic phase, a cholesteric phase or smectic phase.

Clause 46. The apparatus of clause 1, wherein the switchable zone comprises: an adhesive layer; a scratch resistant layer; and a switchable layer between the adhesive layer and the scratch resistant layer, the switchable layer comprising a liquid crystal material and one or more of particles, an optical surface profile or an electrode profile.

Clause 47. The apparatus of clause 45, wherein the adhesive layer is adhered to the lens.

Clause 48. The apparatus of clause 45, wherein the adhesive layer, the scratch resistant layer and the switchable layer comprise a combined thickness within a range from 0.1 mm to 2 mm and optionally within a range from 0.1 mm to 1 mm.

Clause 49. The apparatus of clause 45, wherein the scratch resistant layer comprises a thickness within a range from 10 microns to 100 microns, the adhesive layer comprises a thickness within a range from 10 microns to 100 microns and the switchable layer comprises a thickness within a range from 25 microns to 1000 microns.

Clause 50. The apparatus of clause 45, wherein the scratch resistant layer comprises a substantially transparent electrode oriented toward the switchable layer and the adhesive layer comprises a substantially transparent electrode oriented toward the switchable layer.

Clause 51. The apparatus of clause 49, wherein each of the substantially transparent electrodes comprises a thickness within a range from 25 to 250 Angstroms and optionally wherein each of the substantially transparent electrodes comprises and indium tin oxide (ITO) electrode.

Clause 52. The apparatus of clause 1, further comprising a power source to apply a voltage to the switchable zone and optionally wherein the power source comprises a rechargeable battery.

Clause 53. The apparatus of clause 1, further comprising circuitry coupled to the switchable zone to control a configuration of the switchable zone, the circuitry comprising one or more of a processor, a microcontroller, a sensor or logic circuitry to control the configuration of the switchable zone and optionally wherein the switchable zone comprises the first configuration of the second configuration in response to inputs to the circuitry.

Clause 54. The apparatus of clause 52, wherein the circuitry is configured to vary an amount of light scatter of the switchable zone to vary an amount of substantially scattered light and optionally wherein the first configuration comprises a plurality of configurations each configured to scatter a different amount of light.

Clause 55. The apparatus of clause 52, wherein the circuitry is configured to vary an amount of optical power of the switchable zone and optionally wherein the first configuration comprises a plurality of configurations each configured to provide a different amount of optical power.

Clause 56. The apparatus of clause 1, wherein the electroactive material comprises a liquid crystal material, the liquid crystal material comprising a refractive index within a range from 1.5 to 1.65 and wherein the liquid crystal material is configured to change the refractive index by an amount within a range from 0.10 to 0.25.

Clause 57. The apparatus of clause 1, wherein the switchable zone comprises one or more of an optical surface profile or an electrode profile on a surface of a substantially transparent substrate material.

Clause 58. The apparatus of clause 56, wherein the substrate material comprises a refractive index within a range from 1.5 to 1.7 and optionally wherein the refractive index corresponds to the sodium D line at approximately 589 nm.

Clause 59. The apparatus of clause 56, wherein the substrate material comprises one or more of ion doped glasses, polyacrylates, polymethacrylates, polyaromatics, polysulfones, polyimides, polyamides, polyethers, polyether ketones, or polycyclic olefins.

Clause 60. The apparatus of clause 56, wherein the liquid crystal material is switchable from a first refractive index in the first configuration to provide optical power to a second refractive index in the second configuration to substantially transparently transmit light through the substrate material and wherein the second refractive index is closer to a refractive index of the substrate material in the second configuration.

Clause 61. The apparatus of clause 59, wherein the first refractive index differs from the refractive index of the substrate material by at least 0.05 to provide optical power and the second refractive index differs from the refractive index of the substrate material by no more than 0.02 to substantially transparently transmit light.

Clause 62. The apparatus of clause 56, wherein the liquid crystal material is configured to provide a change in refractive index within a range from 0.10 to 0.25.

Clause 63. The apparatus of clause 56, wherein the liquid crystal material comprises a transparent material with a glass transition temperature below −10 degrees C. and a melting point above 100 degrees C. and optionally wherein the liquid crystal material comprises one or more of a nematic phase, a cholesteric phase or smectic phase.

Clause 64. An electroactive component for use with a lens to treat refractive error of an eye, the electroactive component comprising: an adhesive layer configured to adhere to a lens; a scratch resistant layer; and a switchable layer between the adhesive layer and the scratch resistant layer, the switchable layer comprising a liquid crystal material and one or more of particles, an optical surface profile or an electrode profile.

Clause 65. The electroactive component of clause 63, wherein the switchable layer does not extend over a central portion sized and shaped to provide an optical zone on the lens.

Clause 66. The electroactive component of clause 63, further comprising circuitry coupled to the switchable zone to control a configuration of the switchable zone, the circuitry comprising one or more of a processor, a microcontroller, a sensor or logic circuitry to control the configuration of the switchable zone and optionally wherein the switchable zone comprises the first configuration of the second configuration in response to inputs to the circuitry.

Embodiments of the present disclosure have been shown and described as set forth herein and are provided by way of example only. One of ordinary skill in the art will recognize numerous adaptations, changes, variations and substitutions without departing from the scope of the present disclosure. Several alternatives and combinations of the embodiments disclosed herein may be utilized without departing from the scope of the present disclosure and the inventions disclosed herein. Therefore, the scope of the presently disclosed inventions shall be defined solely by the scope of the appended claims and the equivalents thereof

What is claimed is:

1. An apparatus to treat refractive error of an eye, the apparatus comprising:
    a lens comprising an optical zone; and
    a switchable zone extending at least partially around the optical zone, wherein the switchable zone comprises an electroactive material switchable between a first configuration to substantially scatter or defocus light and a second configuration to substantially transparently transmit light through the lens;
    wherein switchable zone is configured to focus an image of an object anterior or posterior to the retina in the first configuration and to focus the image of the object onto the retina in the second configuration;
    wherein the lens comprises a first side and a second side, the switchable zone located on the first side, the second side comprising a curvature to provide a majority of an optical power of the lens.

2. The apparatus of claim 1, wherein the switchable zone is substantially translucent in the first configuration and substantially transparent in the second configuration.

3. The apparatus of claim 1, wherein images viewed through the switchable zone in the first configuration appear blurry.

4. The apparatus of claim 3, wherein the switchable zone comprises a liquid crystal material configured to vary an optical power of the switchable zone and wherein a first optical power of the switchable zone in the first configuration differs from a second optical power of the switchable zone in the second configuration.

5. The apparatus of claim 4, wherein the switchable zone comprises a plurality of switchable lenslets to vary the optical power of the plurality of switchable lenslets, the plurality of switchable lenslets comprising an index of refraction different from a first index of refraction of the electroactive material in the first configuration to vary the optical power and defocus light in the first configuration.

6. The apparatus of claim 5, wherein the electroactive material comprises a second index of refraction in the second configuration closer to the index of refraction of the plurality of switchable lenslets.

7. The apparatus of claim 6, wherein each of the plurality of switchable lenslets comprises the index of refraction and an optical profile related to an amount of defocus in the first configuration.

8. The apparatus of claim 1, wherein an optical power of the optical zone remains substantially fixed for the first configuration and the second configuration of the switchable zone.

9. The apparatus of claim 1, wherein the lens comprises an optical power and the optical zone comprises the optical power.

10. The apparatus of claim 1, wherein the switchable zone comprises the first configuration when a voltage is applied to the switchable zone and the second configuration without the voltage applied to the switchable zone.

* * * * *